US009705643B2

(12) United States Patent
Li et al.

(10) Patent No.: US 9,705,643 B2
(45) Date of Patent: Jul. 11, 2017

(54) HIGH-EFFICIENCY WIRELESS LOCAL-AREA NETWORK DEVICES AND METHODS FOR ACKNOWLEDGEMENTS DURING SCHEDULED TRANSMISSION OPPORTUNITIES

(71) Applicant: Intel IP Corporation, Santa Clara, CA (US)

(72) Inventors: Guoqing C. Li, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/563,406

(22) Filed: Dec. 8, 2014

(65) Prior Publication Data

US 2016/0020885 A1    Jan. 21, 2016

Related U.S. Application Data

(60) Provisional application No. 62/024,813, filed on Jul. 15, 2014.

(51) Int. Cl.
*H04L 1/18* (2006.01)
*H04L 1/16* (2006.01)

(52) U.S. Cl.
CPC .......... *H04L 1/1854* (2013.01); *H04L 1/1685* (2013.01)

(58) Field of Classification Search
None
See application file for complete search history.

(56) References Cited

U.S. PATENT DOCUMENTS 9,648,620 B2    5/2017  Tandra
2007/0207742 A1  9/2007  Kim et al.
2008/0232339 A1  9/2008  Yang et al.
(Continued)

FOREIGN PATENT DOCUMENTS

CN    106464652 A    2/2017
TW    201251382 A    12/2012
(Continued)

OTHER PUBLICATIONS

"International Application Serial No. PCT/CN2014/086532, International Search Report mailed Dec. 17, 2014", 4 pgs.
(Continued)

*Primary Examiner* — Diane Lo
(74) *Attorney, Agent, or Firm* — Schwegman Lundberg & Woessner, P.A.

(57) ABSTRACT

Embodiments of a system and method for acknowledging frames in a wireless network are generally described herein. In some embodiments, a wireless communication device may include a transmit/receive unit configured to receive data from a sender. In some embodiments, the transmit/receive unit may be configured to receive a schedule. The transmit/receive unit may be further configured to acknowledge (ACK) the data in a first scheduled transmission to the sender. The first scheduled transmission to the sender may be determined based on the schedule. In some embodiments, the acknowledgement may be an acknowledgement frame or a block acknowledgment frame. The scheduled transmission to the sender may be determined based on the schedule.

23 Claims, 6 Drawing Sheets

(56) References Cited

U.S. PATENT DOCUMENTS

| | | |
|---|---|---|
| 2008/0240275 A1 | 10/2008 | Cai |
| 2009/0270109 A1 | 10/2009 | Wang Helmersson et al. |
| 2010/0046671 A1 | 2/2010 | Sadri et al. |
| 2011/0085513 A1 | 4/2011 | Chen et al. |
| 2011/0222486 A1 | 9/2011 | Hart |
| 2011/0235593 A1 | 9/2011 | Gong et al. |
| 2011/0261769 A1 | 10/2011 | Ji et al. |
| 2011/0305296 A1 | 12/2011 | Van Nee |
| 2012/0002756 A1 | 1/2012 | Zhang et al. |
| 2012/0106362 A1 | 5/2012 | Reumerman et al. |
| 2012/0201213 A1 | 8/2012 | Banerjea et al. |
| 2012/0314697 A1 | 12/2012 | Noh et al. |
| 2013/0188567 A1* | 7/2013 | Wang .................. H04L 5/0094 370/329 |
| 2013/0188572 A1 | 7/2013 | Cheong et al. |
| 2013/0250940 A1 | 9/2013 | Parlamas |
| 2013/0286959 A1 | 10/2013 | Lou et al. |
| 2013/0301551 A1 | 11/2013 | Ghosh et al. |
| 2014/0307650 A1 | 10/2014 | Vermani et al. |
| 2014/0369276 A1* | 12/2014 | Porat .................. H04L 5/003 370/329 |
| 2015/0023335 A1 | 1/2015 | Vermani et al. |
| 2015/0063255 A1 | 3/2015 | Tandra et al. |
| 2015/0124690 A1* | 5/2015 | Merlin .................. H04L 5/0055 370/312 |
| 2015/0124745 A1 | 5/2015 | Tandra et al. |
| 2015/0139119 A1 | 5/2015 | Azizi et al. |
| 2015/0146808 A1* | 5/2015 | Chu .................. H04L 5/0037 375/260 |
| 2015/0207599 A1 | 7/2015 | Kim et al. |
| 2017/0111154 A1 | 4/2017 | Azizi et al. |

FOREIGN PATENT DOCUMENTS

| | | |
|---|---|---|
| TW | 201322786 A | 6/2013 |
| TW | 201406107 A | 2/2014 |
| TW | 201141288 A | 10/2014 |
| TW | 201538023 A | 10/2015 |
| TW | 201541889 A | 11/2015 |
| TW | 201541890 A | 11/2015 |
| TW | 201605271 A | 2/2016 |
| WO | WO-2011153507 A2 | 12/2011 |
| WO | WO-2013055117 A2 | 4/2013 |
| WO | WO-2013191609 A1 | 12/2013 |
| WO | WO-2015076917 A1 | 5/2015 |
| WO | WO-2015077096 A1 | 5/2015 |
| WO | WO-2015127777 A1 | 9/2015 |
| WO | WO-2016010651 A1 | 1/2016 |

OTHER PUBLICATIONS

"International Application Serial No. PCT/CN2014/086532, Written Opinion mailed Dec. 17, 2014", 4 pgs.

"International Application Serial No. PCT/US2014/055996, International Search Report mailed Dec. 17, 2014", 3 pgs.

"International Application Serial No. PCT/US2014/055996, Written Opinion mailed Dec. 17, 2014", pgs.

"International Application Serial No. PCT/US2014/065166, International Search Report mailed Jan. 22, 2015", 3 pgs.

"International Application Serial No. PCT/US2014/065166, Written Opinion mailed Jan. 22, 2015", 6 pgs.

Choi, Jinsoo, "Discussion on OFDMA in HEW", In: IEEE P802.11—High Efficiency WLAN Study Group, (Nov. 11, 2013), 11 pgs.

Chun, Jinyoung, et al., "Legacy Support on HEW frame structure", IEEE 11-13/1057r0, (Sep. 16, 2013), 8 pgs.

Chun, Jinyoung, et al., "Uplink multi-user transmission", In: IEEE P802.11—High Efficiency WLAN Study Group, (Nov. 11, 2013), 18 pgs.

Hiertz, Guido R, et al., "Proposed direction and priorities for HEW", In: IEEE P802.11—High Efficiency WLAN Study Group, (Nov. 12, 2013), 17 pgs.

Koskela, Timo, et al., "Discussion on Potential Techniques for HEW", In: IEEE P802.11—High Efficiency WLAN Study Group, (Jul. 15, 2013), 13 pgs.

"(Discussion on potential techniques for HEW", IEEE 802.11-13/0871 rO), (Jul. 15, 2013), 13 pgs.

"U.S. Appl. No. 14/458,000, Non Final Office Action mailed Dec. 3, 2015", 16 pgs.

"International Application Serial No. PCT/US2015/035114, International Search Report mailed Oct. 19, 2015", 3 pgs.

"International Application Serial No. PCT/US2015/035114, Written Opinion mailed Oct. 19, 2015", 8 pgs.

"U.S. Appl. No. 14/458,000, Final Office Action mailed May 9, 2016", 11 pgs.

"U.S. Appl. No. 14/458,000, Response filed Mar. 3, 2015 to Non Final Office Action mailed Dec. 3, 2015", 15 pgs.

"International Application Serial No. PCT/US2014/055996, International Preliminary Report on Patentability mailed Jun. 2, 2016", 7 pgs.

"International Application Serial No. PCT/US2014/065166, Internationl Preliminary Report on Patentability mailed Jun. 2, 2016", 8 pgs.

"Taiwanese Application Serial No. 104101656, Office Action mailed Mar. 21, 2016", 7 pgs.

"Taiwanese Application Serial No. 104108803, Office Action mailed Jul. 1, 2016", 4 pgs.

"Taiwanese Application Serial No. 104108807, Office Action mailed May 26, 2016", W/ English Search Report, 10 pgs.

"U.S. Appl. No. 14/458,000, Notice of Allowance mailed Aug. 24, 2016", 11 pgs.

"U.S. Appl. No. 14/458,000, Response filed Aug. 8, 2016 to Final Office Action mailed May 9, 2016", 12 pgs.

"European Application Serial No. 14864664.9, Response filed Dec. 22, 2016 to Communication pursuant to Rules 161(2) and 162 EPC mailed Jun. 28, 2016", 4 pgs.

"Taiwanese Application Serial No. 104101656, Response filed Sep. 22, 2016 to Office Action mailed Mar. 21, 2016", W/ English Claims, 43 pgs.

"Taiwanese Application Serial No. 104108807, Response filed Nov. 25, 2016 Office Action mailed May 26, 2016", W/ English Claims, 65 pgs.

"Taiwanese Application Serial No. 104117983, Office Action mailed Jul. 28, 2016", 5 pgs.

"European Application Serial No. 17153414.2, Extended European Search Report mailed May 3, 2017", 8 pgs.

"Taiwanese Application Serial No. 104101656, Office Action mailed Mar. 7, 2017", With English Claims, 13 pgs.

"U.S. Appl. No. 15/280,782, Non Final Office Action mailed May 12, 2017", 25 pgs.

"U.S. Appl. No. 15/394,069, Non Final Office Action mailed May 26, 2017", 18 pgs.

* cited by examiner

HIGH-EFFICIENCY WIRELESS LOCAL-AREA NETWORK DEVICES AND METHODS FOR ACKNOWLEDGEMENTS DURING SCHEDULED TRANSMISSION OPPORTUNITIES

PRIORITY CLAIM

This application claims the benefit of priority under 35 USC 119(e) to U.S. Provisional Patent Application Ser. No. 62/024,813, filed Jul. 15, 2014 [reference number P70598Z] which is incorporated herein by reference in its entirety.

TECHNICAL FIELD

Some embodiments described herein generally relate to acknowledgement policies in wireless local-area networks (WLANs), some embodiments generally relate to acknowledgement policies for high-efficiency wireless communications including high-efficiency WLAN and high-efficiency wireless (HEW) communications, and some embodiments relate to acknowledgement policies in 802.11ax.

BACKGROUND

One issue with communicating data over a wireless network is acknowledging received packets. Often acknowledging received packets consumes bandwidth.

Thus, there are general needs for systems and methods that reduce signaling, bandwidth and/or delay associated with communicating acknowledgments of packets.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
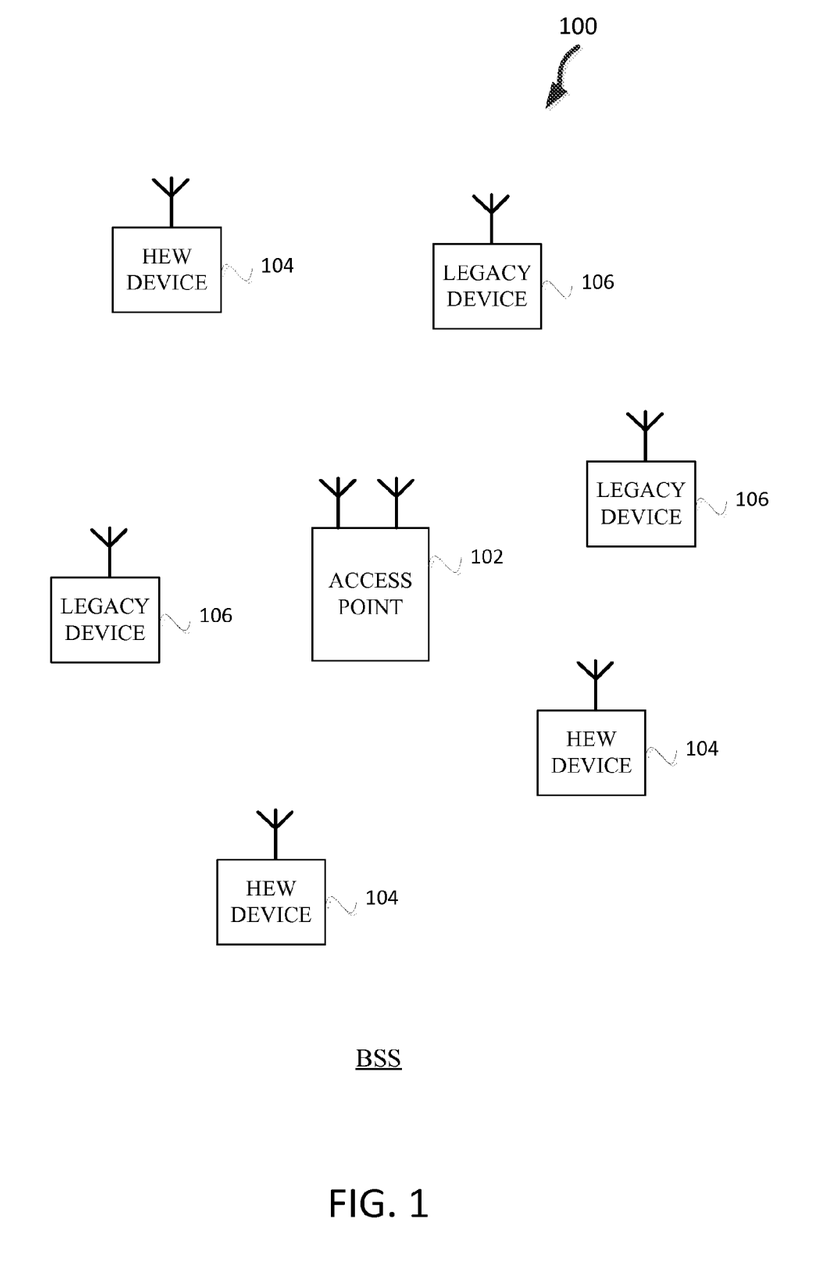
FIG. 1 illustrates a wireless network in accordance with some embodiments.

FIG. 1 illustrates a wireless network in accordance with some embodiments. The wireless network may comprise a basis service set (BSS) 100 that may include an access point (AP) 102, a plurality of HEW devices 104 and a plurality of legacy devices 106.

The AP 102 may be an access point (AP) using the Institute of Electrical and Electronics Engineers (IEEE) 802.11 to transmit and receive. In example embodiments, the AP 102 may be a base station. The AP 102 may use other communications protocols as well as the 802.11 protocol. For example the AP 102 may use 802.16 or 802.15.1. The 802.11 protocol may be 802.11ax. The 802.11 protocol may include using Orthogonal Frequency-Division Multiple Access (OFDMA) and/or Space-Division Multiple Access (SDMA). The 802.11 may include using multi-user multiple-input and multiple-output (MU-MIMO). The HEW devices 104 may operate in accordance with 802.11ax. The legacy devices 106 may operate in accordance with one or more of 802.11a/g/ag/n/ac, or another legacy wireless communication standard. In example embodiments, the BSS 100 may include more than one AP 102.

The HEW devices 104 may be wireless transmit and receive devices such as cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, HEW frames may be configurable to have the same bandwidth or different bandwidths, and the bandwidth may be one of 20 MHz, 40 MHz, or 80 MHz contiguous bandwidths or an 80+80 MHz (160 MHz) non-contiguous bandwidth, or another bandwidth. In some embodiments, a 320 MHz contiguous bandwidth may be used. In some embodiments, bandwidths of 1 MHz, 1.25 MHz, 2.5 MHz, 5 MHz, 10 MHz, or another bandwidth, or a combination thereof may also be used. In these embodiments, a HEW frame may be configured for transmitting a number of spatial streams.

In other embodiments, the AP 102, HEW device 104, and/or legacy device 106 may implement one or more of different technologies such as code-division multiple-access (CDMA) 2000, CDMA2000 1x, CDMA2000 evolution data-optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), Long-Term Evolution (LTE), 802.15.1, and IEEE 802.16 (i.e., Worldwide Interoperability for Microwave Access (WiMAX)).

In an OFDMA system such as 802.11ax, an associated HEW device 104 may operate on different 20 MHz sub-channel of the BSS 100. For example, the BSS 100 may operate on a 80 MHz bandwidth with four subchannels of 20 MHz each.

In example embodiments, an AP 102, HEW devices 104, and legacy devices 106 use carrier sense multiple access/collision avoidance (CSMA/CA). In some embodiments, the media access control (MAC) 606 layer (see FIG. 6) controls access to the wireless media.

In example embodiments, an AP 102, HEW devices 104, legacy devices 106, perform carrier sensing and can detect whether or not the channel is free. For example, an AP 102, HEW device 104, or legacy device 106 may use clear channel assessment (CCA) which may include a determination whether or not the channel is clear based on a Decibel-milliwatts (dBm) level of reception. In example embodiments, the physical layer (PHY) 604 (FIG. 6) is configured to determine a CCA for an AP 102, HEW devices 104, and legacy devices 106.

In example embodiments, an AP 102, HEW devices 104, legacy devices 106, access the channel in different ways. For example, in accordance with some IEEE 802.11ax embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional 802.11 communications in which legacy devices 106 and, optionally, HEW devices 104 communicate in accordance with a contention-based communication technique, rather than a multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The AP 102 may also communicate with legacy devices 106 in accordance with legacy IEEE 802.11 communication techniques. In some embodiments, the master station may also be configured to communicate with HEW stations outside the HEW control period in accordance with legacy IEEE 802.11 communication techniques, although this is not a requirement. HEW devices 104 may be termed HE (high-efficiency) devices. HEW devices 104 may be also/alternatively termed high-efficiency Wi-Fi® (HEW) devices.

Figure 2:
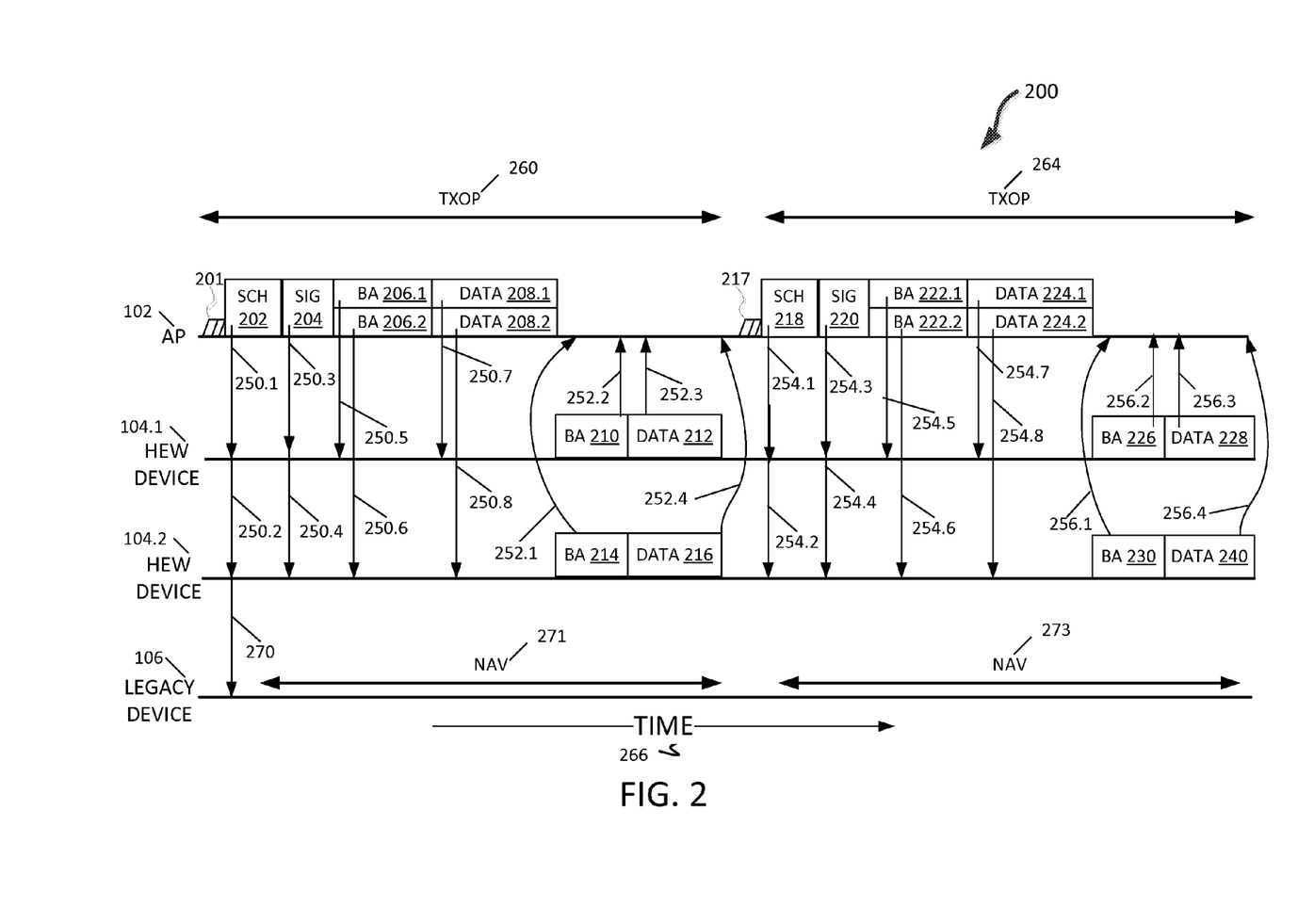
FIG. 2 is a method of acknowledgment in 802.11 in accordance with example embodiments.
Figure 3:
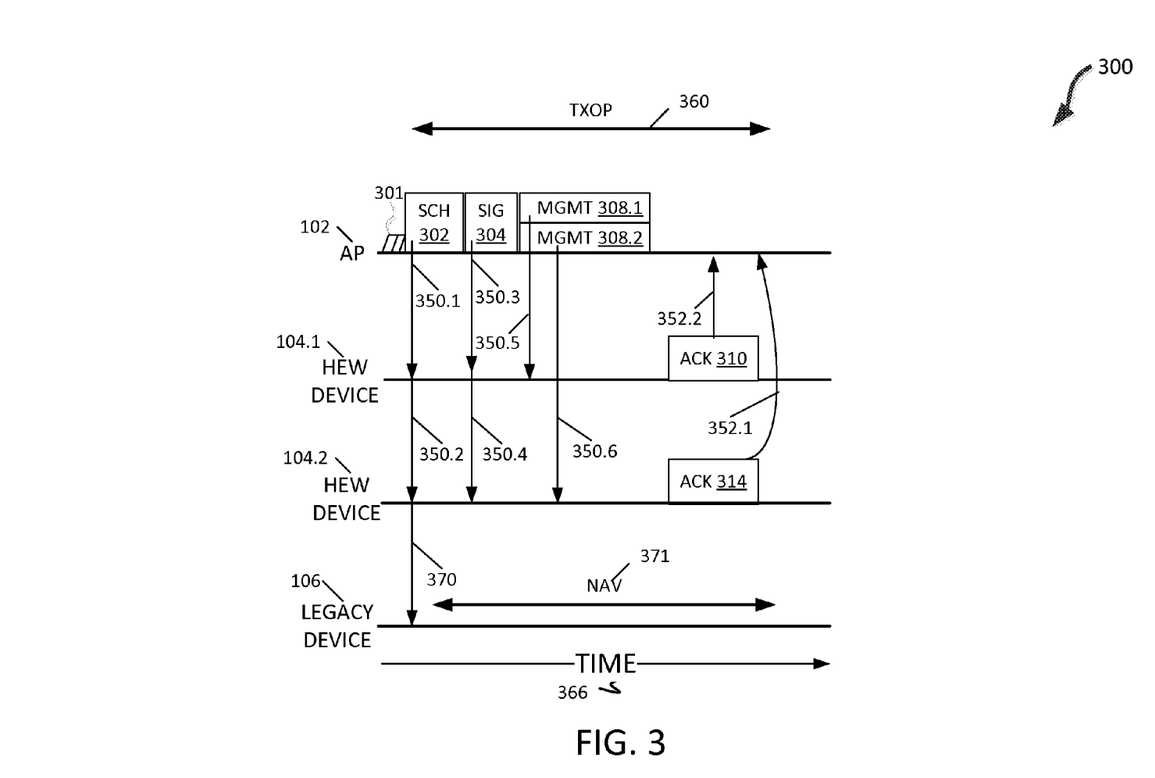
FIG. 3 is a method of acknowledgment in 802.11 in accordance with example embodiments.
Figure 4:
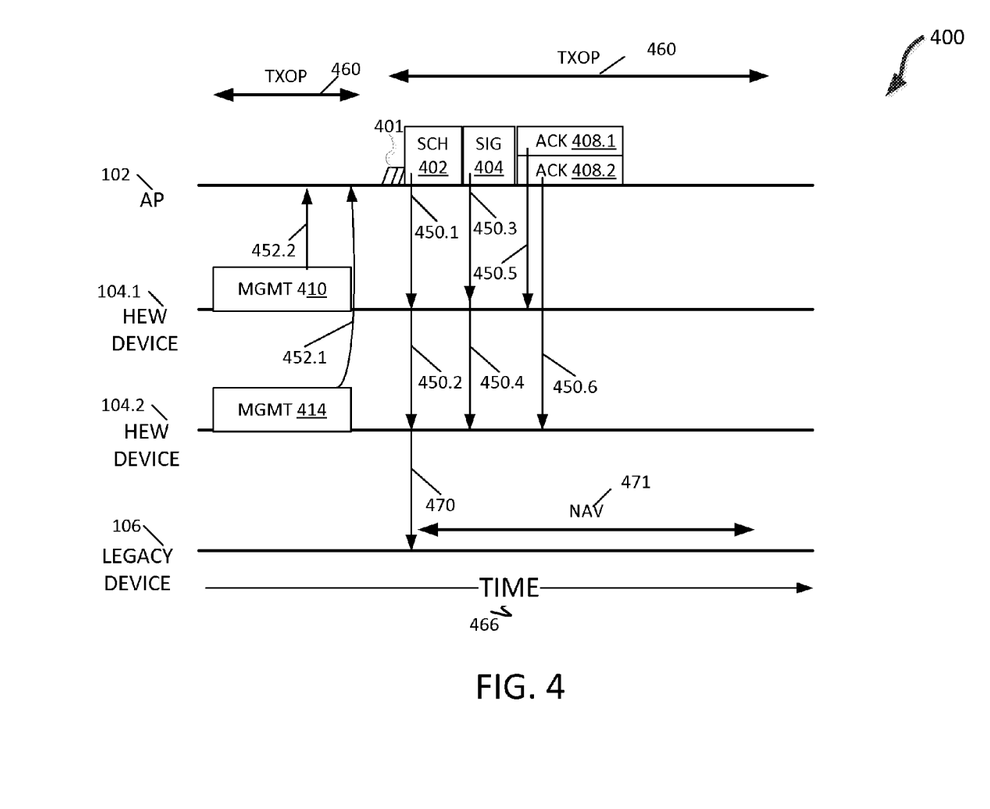
FIG. 4 is a method of acknowledgment in 802.11 in accordance with example embodiments.

In example embodiments, the HEW device 104 and AP 102 are configured to perform one or more of the functions and/or methods described herein for acknowledgements and block acknowledgements such as the methods, apparatuses, and functions described in conjunction with FIGS. 2 through 4, and in relation to packet 500.

FIG. 2 is a method 200 of acknowledgment in 802.11 in accordance with example embodiments. Illustrated in FIG. 2 is time 266 along the horizontal axis and along the vertical axis are AP 102, HEW device 104.1, HEW device 104.2, and legacy device 106. In example embodiments, there may be one or more HEW devices 104.1, 104.2, one or more APs 102, and one or more legacy devices 106.

In example embodiments, the method 200 begins with the AP 102 transmitting during a contention period 201. The AP 102 contends for the wireless medium with other wireless devices: HEW device 104.1, HEW device 104.2, and legacy device 106. At the end of the contention period 201, the AP 102 has determined that the wireless medium may be free and determines to transmit. In each of the method operations, the AP 102 may transmit according to OFDMA, SDMA, and/or MU-MIMO.

The method 200 continues with the AP 102 transmitting the schedule (SCH) 202 to HEW device 104.1, HEW device 104.2, and legacy device 106 as shown by arrows 250.1, 250.2, 270. In example embodiments, the SCH 202 may include a legacy header that the legacy device 106 can decode. In example embodiments, the SCH 202 includes an indication for how long the legacy device 106 should set a network allocation vector (NAV), which indicates how long not to try to access the wireless medium. In example embodiments, the legacy device 106 sets the NAV 271 based on a received legacy header from the AP 102. In example embodiments, the SCH 202 is an indication of a stream and time when a HEW device 104 is scheduled for uplink transmission. In example embodiments, the SCH 202 may be a separate packet. In example embodiments, the schedule (SCH) 202 is included in a SIG 204 packet, a management packet such as a beacon or any appropriate packet that is transmitted from the AP 102 to the HEW devices 104.1, 104.2. In example embodiments, the SCH 202 includes a schedule for two or more HEW devices 104.1, 104.2. In example embodiments, the SCH 202 includes a schedule for only one HEW device 104.1, 104.2. In some embodiments, the SCH 202 may indicate when the AP 102 is scheduled to transmit and receive. In example embodiments, the SCH 202 is configured according to one or more standards such as 802.11ax.

In example embodiments, the SCH 202 includes a schedule for both HEW device 104.1 and HEW device 104.2. In example embodiments, the AP 102 transmits simultaneously a separate SCH 202 to each HEW device 104.1, 104.2 as shown by arrows 250.1, 250.2. For example, the AP 102 may transmit on one sub-channel a first SCH (not illustrated), and simultaneously transmit on a second sub-channel a second SCH (not illustrated). In example embodiments, the AP 102 may transmit on one spatial stream a first SCH, and simultaneously transmit on a second sub-channel a second SCH. In example embodiments, the SIG 204 is part of a Physical Layer Convergence Procedure (PLCP) Packet Protocol Data Unit (PPDU). In example embodiments, the PPDU may be a multi-user (MU) PPDU.

In example embodiments, one or more of the SCH 202, SIG 204, BA 206, DATA 208, a MAC field, or another frame may indicate a policy for acknowledgement such as a beacon frame or probe response frame. In example embodiments, the policy for acknowledgement may be per PPDU basis. In example embodiments, the policy for acknowledgement may indicate that the block acknowledgement (BA) 210, 214 is to be used in a next scheduled MU-PPDU. In example embodiments, the policy for acknowledgement may be pre-setup by the AP 102 and HEW devices 104.1, 104.2 exchanging a new MAC management frame. For example, an ACK setup management frame for MU transmission may be either unicast or multicast and may carry an acknowledgement policy for multiple HEW devices 104 and/or APs 102.

The AP 102 may, in some example embodiments, announce a new acknowledgement policy in a beacon or probe. The acknowledgement policy may be for data and/or management frames. There may be more than one AP 102. There may be only one HEW device 104.1, 104.2 or more than two, and there may be more than one legacy device 106.

The method 200 continues with the AP 102 transmitting a SIG 204 to the HEW devices 104.1, 104.2 as shown by arrows 250.3, 250.4. In example embodiments, the SIG 204 may be a signal field that includes information regarding the transmission such as a data rate or other information that may indicate information regarding the transmission and/or the AP 102. In example embodiments, the AP 102 transmits the same SIG 204 to the HEW devices 104.1, 104.2. In example embodiments, the AP 102 transmits different SIGs 204 to the HEW devices 104.1, 104.2.

In example embodiments, the AP 102 transmits the SIG 204 according to a standard such as 802.11ax. In example embodiments, the SIG 204 is part of a management frame. In example embodiments, the SIG 204 is part of a Physical Layer Convergence Procedure (PLCP) Protocol Data Unit (PPDU). The PPDU may be a multi-user PPDU.

Optionally, in example embodiments, the method 200 continues with the AP 102 transmitting BA 206.1 and BA 206.2 to HEW device 104.1 and HEW device 104.2 as shown by arrows 250.5, 250.6, respectively. The AP 102 may transmit the BAs 206 simultaneously. The AP 102 may transmit the BAs 206 on different frequencies for MU or may transmit the BAs 206 using spatial diversity on the same frequency. In example embodiments, the BAs 206 are block acknowledgements (BA) that acknowledge previously transmitted data from the HEW devices 104.1, 104.2.

The method 200 continues with the AP 102 transmitting data 208.1, 208.2 as shown by arrows 250.7, 250.8, respectively. In example embodiments the AP 102 transmits (arrows 250.7, 250.8) the data 208.1 and data 208.2 simultaneously. The data 208.1 and data 208.2 may be data intended for HEW device 104.1 and HEW device 104.2, respectively.

The method 200 continues with HEW device 104.1 and HEW device 104.2 transmitting BA 210 and BA 214 as shown by arrows 252.1, 252.2, respectively. As illustrated, HEW device 104.1 may have received SCH 202, SIG 204, BA 206.1, and data 208.1, and HEW device 104.2 may have received SCH 202, SIG 204, BA 206.2, and data 208.2.

In example embodiments, BAs 210, 214 are block acknowledgements of the data 208.1, 208.2, respectively. In example embodiments, the BAs 210, 214 are to be returned in the first scheduled multi-user Physical Layer Convergence Procedure (PLCP) Physical Data Unit (MU-PPDU) from HEW device 104.1 and HEW device 104.2, respectively. In example embodiments, if only one packet was transmitted by the AP 102, then an acknowledgment or block acknowledgment may be transmitted by the HEW devices 104. In example embodiments, an acknowledgment may refer to both an acknowledgment frame and block acknowledgment frame. In example embodiments, a previous packet from the AP 102 indicates that the data 208.1, 208.2 are to be block acknowledged as part of the next multi-user MU-PPDU from the HEW device 104.1 and HEW device 104.2, respectively. In some embodiments, an acknowledgement policy indicates that the block acknowledgement may be part of a subsequent transmission such as the second MU-PPDU.

In some embodiments, the BA 210 and BA 214 are transmitted based on a schedule received from the AP 102. In example embodiments, the HEW devices 104.1, 104.2 do not wait as part of a contention period. In example embodiments, the HEW devices 104.1, 104.2 begin transmitting in accordance with a schedule.

Optionally, the method 200 continues with the HEW devices 104.1, 104.2 transmitting data 212, 216 as shown by arrows 252.3, 252.4, respectively. In some embodiments, the data 212, 216 are transmitted as part of a schedule during an up-link period for the HEW devices 104.1, 104.2 that may be OFDMA and/or MU-MIMO. In example embodiments, the data 212, 216 are transmitted simultaneously. The size of data 212, 216 may be different. In example embodiments, the BA 210 and BA 214 may be part of the data 212, 216 respectively. In example embodiments, the BAs 210, 214 and data 212, 216 may be reversed. In example embodiments, the HEW devices 104.1, 104.2 transmit additional packets such as a management packet such as a probe request or response.

A transmit opportunity (TXOP) 260 may end. The TXOP 260 may be a period set by the AP 102 in a MAC packet that indicates how long other wireless device such as legacy device 106 should defer accessing the wireless medium before attempting to transmit again. The TXOP 260 may include a duration for the HEW devices 104 to transmit an acknowledgment.

Optionally, the method 200 continues with the AP 102 transmitting during a contention period 217. The AP 102 contends for the wireless medium with other wireless devices: HEW device 104.1, HEW device 104.2, and legacy device 106. At the end of the contention period 217 the AP 102 has determined that the wireless medium may be free and determines to transmit. During the contention period 217 other wireless communication devices such as APs 102, HEW devices 104, and legacy devices 106 may have used the wireless medium.

Optionally, the method 200 continues with the AP 102 transmitting schedule (SCH) 218 to HEW device 104.1 and HEW device 104.2 as shown by arrows 254.1, 254.2, respectively. The TXOP 264 may be similar or the same as a TXOP 260 as described above. In example embodiments, the SCH 218 is a schedule as described for SCH 202. The legacy device 106 may set NAV 273 in a similar fashion as NAV 271 is set.

Optionally, the method 200 continues with the AP 102 transmitting a SIG 220 to the HEW devices 104.1, 104.2 as shown by arrows 254.3, 254.4. In example embodiments, the SIG 220 is a signal field as described for SIG 204.

Optionally, the method 200 continues with the AP 102 transmitting BAs 222.1, 222.2 to HEW device 104.1 and HEW device 104.2 as shown by arrows 254.5, 254.6, respectively. In example embodiments the BAs 222.1, 222.2 are block acknowledges of the data 212, 216, respectively. In example embodiments, the BAs 222.1, 222.2 are transmitted after the data 224.

Optionally, the method 200 continues with the AP 102 transmitting data 224.1, 224.2 as shown by arrows 254.7, 254.8, respectively. In example embodiments, the data 224.1, 224.2 is data as described for data 208.

Optionally, the method 200 continues with the HEW devices 104.1, 104.2 transmitting BAs 226, 230 as shown by arrows 256.1, 256.2, respectively, to the AP 102. The BAs 226, 230 may be block acknowledgements as described for BAs 210, 214.

Optionally, the method 200 continues with the HEW devices 104.1, 104.2 transmitting data 228, 240 as shown by arrows 256.3, 256.4, respectively, to the AP 102. In example embodiments, the data 228, 240 may be data as described for data 212, 216. The method 200 may end.

FIG. 3 is a method 300 of acknowledgment in 802.11 in accordance with example embodiments. Illustrated in FIG. 3 is time 366 along the horizontal axis and along the vertical axis are AP 102, HEW device 104.1, HEW device 104.2, and legacy device 106.

In example embodiments, the method 300 begins with the AP 102 transmitting during a contention period 301. The AP 102 contends for the wireless medium with other wireless devices such as HEW device 104.1, HEW device 104.2, and legacy device 106. At the end of the contention period 301, the AP 102 has determined that the wireless medium may be free and determines to transmit. In each of the method operations, the AP 102 may transmit according to OFDMA, SDMA, and/or MU-MIMO.

The method 300 continues with the AP 102 transmitting schedule (SCH) 302 to HEW device 104.1, HEW device 104.2, and legacy device 106 as shown by arrows 350.1, 350.2, 370, respectively. The SCH 302 may be transmitted separately on different bandwidths or spatial streams and/or the SCH 302 may be transmitted on a primary channel so that the legacy device 106 will receive the SCH 302.

In example embodiments, the SCH 302 may be a schedule as described for SCH 202 (FIG. 2). The legacy device 106 may set a NAV 371 based on a legacy header that indicates how long the wireless medium will be used by the AP 102. The period of time the AP 102 has reserved may be called a TXOP 360.

The method 300 continues with the AP 102 transmitting SIG 304 to the HEW device 104.1 and HEW device 104.2 as shown by arrows 350.3, 350.4, respectively. The SIG 304 may be a signal as described for SIG 204 (FIG. 2).

The method 300 continues with the AP 102 transmitting management frames (MGMT) frames 308.1, 308.2 as shown by arrows 350.5, 350.6, respectively. The MGMT frames 308.1, 308.2 may be management frames such as probe responses and probe requests. In example embodiments, the AP 102 may transmit additional packets either before or after the MGMT frames 308.1, 308.2.

The method 300 continues with HEW device 104.1 and HEW device 104.2 transmitting ACKs 310, 314 as shown by arrows 352.2, 352.1, respectively. In example embodiments, the HEW devices 104.1, 104.2 are configured to respond to acknowledge the MGMT frames 308.1, 308.2 in a scheduled MU PPDU. In example embodiments, the HEW devices 104.1, 104.2 are configured to respond to acknowledge the MGMT frames 308.1, 308.2 in a next scheduled MU PPDU. The method 300 may end.

FIG. 4 is a method 400 of acknowledgment in 802.11 in accordance with example embodiments. Illustrated in FIG. 4 is time 466 along the horizontal axis and along the vertical axis are AP 102, HEW device 104.1, HEW device 104.2, and legacy device 106.

The method 400 begins with HEW device 104.1 and HEW device 104.2 transmitting management (MGMT) frames 410, 414 as shown by arrows 452.2, 452.1, respectively. In example embodiments, the HEW devices 104.1, 104.2 may transmit the MGMT frames 410, 414 in a TXOP 460 in which the AP 102 may have reserved time for the HEW devices 104.1, 104.2 to transmit the MGMT frames 410, 414. In example embodiments, the HEW devices 104.1, 104.2 transmit packets before and/or after the MGMT frames 410, 414, respectively.

In example embodiments, the method 400 continues with the AP 102 transmitting during a contention period 401. The method 400 continues with the AP 102 transmitting (indicated by arrows 450.1, 450.2, 470) the SCH 402 to the HEW device 104.1, the HEW device 104.2, and the legacy device 106, respectively.

In example embodiments, the SCH 402 may be a schedule as described for SCH 202 (FIG. 2). The legacy device 106 may set a NAV 471 based on a legacy header that indicates how long the wireless medium will be used by the AP 102. The period of time the AP 102 has reserved may be called a TXOP 460.

The method 400 continues with the AP 102 transmitting SIG 404 to the HEW device 104.1 and the HEW device 104.2 as shown by arrows 450.3, 450.4, respectively. The SIG 404 may be a signal as described for SIG 204 (FIG. 2).

The method 400 continues with the AP 102 transmitting ACKs 408.1, 408.2 of the MGMT frames 410, 414 as shown by arrows 450.5, 450.6, respectively. In example embodiments, the AP 102 may transmit additional packets either before or after the ACKs 408.1, 408.2. In example embodiments, the AP 102 is configured to acknowledge the MGMT frames 410, 414 in a next scheduled PPDU. In example embodiments, the AP 102 is configured to acknowledge the MGMT frames 410, 414 in a next transmit opportunity of the AP 102. In example embodiments, the AP 102 is configured to acknowledge the MGMT frames 410, 414 before sending any data packets (not illustrated). The method 400 may end.

Figure 5:
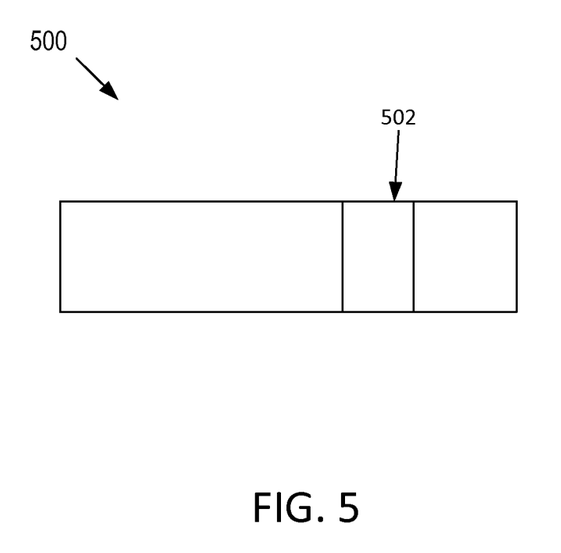
FIG. 5 illustrates a schematic diagram of a packet, according to example embodiments.

FIG. 5 illustrates a schematic diagram of a packet, according to example embodiments. Illustrated in FIG. 5 is a packet 500 and field 502. In example embodiments, the packet 500 may be a new MAC management frame for multi-user operation that indicates an ACK policy. In example embodiments, the packet 500 may be an existing packet with a new or modified field 502. For example, the packet 500 may be a beacon frame, probe response, signal frame, probe request, or another frame suitable to include field 502.

The field 502 may indicate how the HEW devices 104 and/or AP 102 are to acknowledge or block acknowledge frames.

In example embodiments, the field 502 indicates that the HEW device 104 is to acknowledge or block acknowledge frames received in a next scheduled MU PPDU. In example embodiments, the field 502 indicates that the HEW device 104 is to acknowledge or block acknowledge frames received in a next transmitted MU PPDU.

In example embodiments, the field 502 indicates that the HEW devices 104 are to acknowledge or block acknowledge frames received in a next scheduled packet. For example, in one embodiment, the field 502 indicates that the HEW device 104 is to acknowledge frames received in a next packet. In example embodiments, the field 502 indicates that the HEW device 104 is to acknowledge a received management frame in a next transmission opportunity that the HEW device has. In example embodiments, the field 502 indicates that the HEW device 104 is to acknowledge a received management frame in a next MU PPDU transmitted by the HEW device 104.

In example embodiments, the field 502 indicates that the HEW device 104 is to acknowledge or block acknowledge frames in the current transmission opportunity, or if there is not a current transmission opportunity, in a next transmission opportunity. For example, in example embodiments the HEW device 104 can acknowledge or block acknowledge frames after sending data frames.

In example embodiments, the HEW device 104 acknowledging or block acknowledging frames in a next scheduled transmission opportunity has the technical effect of reducing the use of the wireless medium because the HEW device 104 does not have to contend for the wireless medium in order to acknowledge or block acknowledge frames.

In example embodiments, the HEW device 104 acknowledging or block acknowledging frames in a next scheduled MU PPDU has the technical effect of reducing the use of the wireless medium because the HEW device 104 does not have to contend for the wireless medium in order to acknowledge or block acknowledge frames and because the HEW device 104 acknowledges or block acknowledges the received frames concurrently with one or more other HEW devices 104.

In example embodiments, the HEW device 104 acknowledging or block acknowledging frames in a next scheduled MU PPDU has the technical effect of reducing the buffer sizes needed by the AP 102 and HEW device 104 because the HEW device 104 and AP 102 will receive an acknowledge or block acknowledgement sooner and thus will be able to free up buffers sooner.

Figure 6:
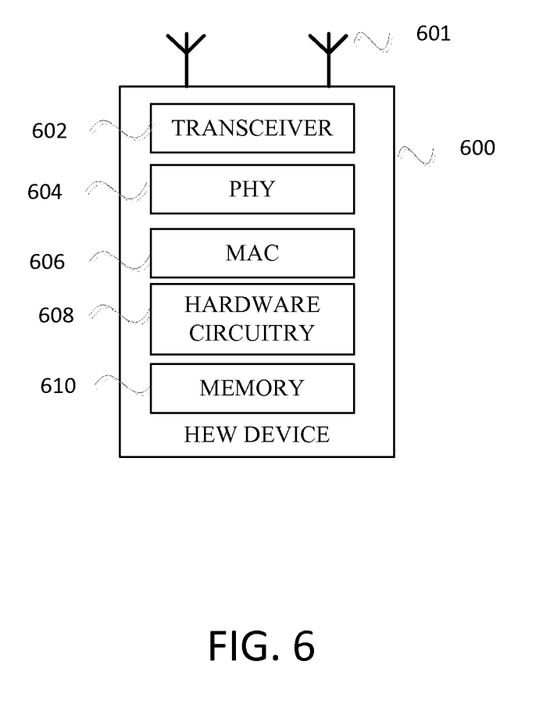
FIG. 6 illustrates a HEW device in accordance with some embodiments.

FIG. 6 illustrates a HEW device 600 in accordance with some embodiments. HEW device 600 may be a HEW-compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 600 may be suitable for operating as access point 102 (FIG. 1) or a HEW device 104 (FIG. 1). In accordance with embodiments, HEW device 600 may include, among other things, a transmit/receive element 601 (for example an antenna), a transceiver 602, physical layer circuitry (PHY) 604 and medium-access control layer circuitry (MAC) 606. PHY 604 and MAC 606 may be HEW-compliant layers and may also be compliant with one or more legacy IEEE 802.11 standards. MAC 606 may be arranged to configure PPDUs and arranged to transmit and receive PPDUs, among other things. HEW device 600 may also include other hardware circuitry 608 and memory 610 configured to perform the various operations described herein. The hardware circuitry 608 may be coupled to the transceiver 602, which may be coupled to the transmit/receive element 601. While FIG. 6 depicts the hardware circuitry 608 and the transceiver 602 as separate components, the hardware circuitry 608 and the transceiver 602 may be integrated together in an electronic package or chip.

In example embodiments, the HEW device 104 is configured to perform one or more of the functions and/or methods described herein such as the methods, apparatuses, and functions described in conjunction with FIGS. 2 through 4, and in relation to packet 500.

The PHY 604 may be arranged to transmit the HEW PPDU. The PHY 604 may include circuitry for modulation/demodulation, upconversion/downconversion, filtering, amplification, etc. In some embodiments, the hardware circuitry 608 may include one or more processors. The hardware circuitry 608 may be configured to perform functions based on instructions being stored in a RAM or ROM, or based on special purpose circuitry. In some embodiments, the hardware circuitry 608 may be configured to perform one or more of the functions described herein for sending and receiving BARs and BAs.

In some embodiments, two or more antennas may be coupled to the PHY 604 and arranged for sending and receiving signals including transmission of the HEW packets. The HEW device 600 may include a transceiver 602 to transmit and receive data such as HEW PPDU and packets that include an indication that the HEW device 600 should adapt the channel contention settings according to settings included in the packet. The memory 610 may store information for configuring the other circuitry to perform operations for one or more of the functions and/or methods described herein for acknowledgements and block acknowledgements such as the methods, apparatuses, and functions described in conjunction with FIGS. 2 through 4, and in relation to packet 500.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, standards and/or proposed specifications for WLANs, although the scope of the example embodiments is not limited in this respect as they may also be suitable to transmit and/or receive communications in accordance with other techniques and standards. In some embodiments, the HEW device 600 may use 4× symbol duration of 802.11n or 802.11ac.

In some embodiments, a HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example embodiments have the technical effect of increasing the efficiency of the wireless medium by acknowledging or block acknowledging packets during a next transmission opportunity. In example embodiments, the HEW devices do not use the wireless medium for contention, but rather wait for a next transmission opportunity before acknowledging or block acknowledging the packets.

Example embodiments have the technical effect of increasing the efficiency of the wireless medium by acknowledging management packets during a next transmission opportunity. In example embodiments, the HEW devices do not use the wireless medium for contention, but rather wait for a next transmission opportunity before acknowledging the management packets.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The following examples pertain to further embodiments. Example 1 is a high-efficiency wireless local-area network (HEW) device. The HEW device may include circuitry configured to: receive one or more packets in a transmit opportunity (TXOP) from an access point (AP), wherein the one or more packets indicate a schedule for the HEW device to transmit a multi-user physical-layer convergence procedure protocol data unit (MU PPDU); and transmit an acknowledgement of the one or more packets in the MU PPDU.

In Example 2, the subject matter of Example 1 can optionally include where the acknowledgement is one from the following group: a block acknowledgement frame and acknowledgment frame.

In Example 2, the subject matter of Examples 1 and 2 can optionally include where the circuitry is further to: transmit the acknowledgement frame and the block acknowledgement frame in a first scheduled PPDU.

In Example 4, the subject matter of any of Examples 1 through 3 can optionally include where the one or more packets from the AP comprise a management frame, and wherein the circuitry is further configured to: transmit the acknowledgement of the management frame in a first scheduled MU PPDU.

In Example 5, the subject matter of any of Examples 1-4 can optionally include where the circuitry is further to: transmit one or more data packets to the AP.

In Example 6, the subject matter of any of Examples 1-5 can optionally include where the circuitry is further to: transmit the one or more data packets to the AP in the TXOP after the transmission of the acknowledgement of the one or more packets from the AP.

In Example 7, the subject matter of Examples 5 or 6 can optionally include where the circuitry is further to: receive an acknowledgement from the AP to the transmitted one or more data packets in a next TXOP.

In Example 8, the subject matter of any of Examples 1-7 can optionally include where the schedule includes a bandwidth for the HEW device to transmit and an indication of a duration for how long the HEW device can transmit.

In Example 9, the subject matter of any of Examples 1-8 can optionally include where the circuitry is further to: wait a short interface space and then transmit the acknowledgement of the one or more packets in the TXOP.

In Example 10, the subject matter of any of Examples 1-9 can optionally include where the circuitry is further to: receive an indication to use a new acknowledgement policy in at least one of a signal (SIG) field, in a media access control (MAC) field, in a beacon field, probe response, or a MAC management frame; and wherein the circuitry is further configured to: transmit an acknowledgement of the one or more packets in the scheduled MU PPDU, if the indication of the new acknowledgement policy is received, otherwise transmit the acknowledgement of the one or more packets according to a legacy protocol.

In Example 11, the subject matter of any of Examples 1-10 can optionally include where the one or more data packets are transmitted using orthogonal frequency division multiple access (OFDMA) and multi-user multiple-input multiple-output (MU-MIMO) and in accordance with 802.11ax.

In Example 12, the subject matter of any of Examples 1-11 can optionally include where the schedule includes a duration for the acknowledgment of the one or more packets.

In Example 13, the subject matter of any of Examples 1-12 can optionally include memory and a transceiver coupled to the circuitry.

In Example 14, the subject matter of Example 13 can optionally include one or more antennas coupled to the transceiver.

Example 15 is a method for acknowledgement performed on a high-efficiency wireless local-area network (HEW) device. The method may include receiving one or more packets in a transmit opportunity (TXOP) from an access point (AP), wherein the one or more packets indicate a schedule for the HEW device to transmit a multi-user physical-layer convergence procedure protocol data unit (MU PPDU); and transmitting an acknowledgement of the one or more packets in the MU PPDU.

In Example 16, the subject matter of Example 15 can optionally include where the acknowledgement is one from the following group: an acknowledgement frame and block acknowledgement frame.

In Example 17, the subject matter of Examples 15 and 16 can optionally include where the transmitting the acknowledgement further comprises: transmitting the acknowledgement in a first scheduled PPDU.

In Example 18, the subject matter of Examples 16 or 17 can optionally include where the schedule includes a duration for the acknowledgment of the one or more packets.

Example 19 is an access point (AP) including circuitry configured to: transmit one or more packets in a transmit opportunity (TXOP) to each of one or more high-efficiency wireless local-area network (HEW) devices, wherein the one or more packets indicate a schedule for each of the one or more HEW devices to transmit a multi-user physical-layer convergence procedure protocol data unit (MU PPDU); and receive an acknowledgement from each of the one or more HEW devices of the corresponding MU PPDU.

In Example 20, the subject matter of Example 19 can optionally include memory; a transceiver coupled to the circuitry; and one or more antennas coupled to the transceiver.

In Example 21, the subject matter of Examples 19 and 20 can optionally include where the acknowledgment is one from the following group: acknowledgement frame and block acknowledgement frame.

In Example 22, the subject matter of Example 21 can optionally include where the schedule includes a duration for each of the one or more HEW devices to transmit the acknowledgment of the one or more packets.

In Example 23, the subject matter of any of Examples 19-23 can optionally include where the circuitry is further configured to: receive a management frame from at least one of the one or more HEW devices; and transmit an acknowledgement of the management frame to each of the at least one of the one or more HEW devices in a next scheduled MU-PPDU.

Example 24 is a non-transitory computer-readable storage medium that stores instructions for execution by one or more processors to perform operations for high-efficiency wireless local-area network (HEW), where the instructions configure the one or more processors to: receive one or more packets in a transmit opportunity (TXOP) from an access point (AP), wherein the one or more packets indicate a schedule for to transmit a multi-user physical-layer convergence procedure protocol data unit (MU PPDU); and transmit an acknowledgement of the one or more packets in the scheduled MU PPDU.

In Example 24, the subject matter of Example 25 can optionally include herein the acknowledgement is one from the following group: an acknowledgment frame and block acknowledgment frame.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A high-efficiency (HE) device, the HE device comprising: memory; and, circuitry coupled to the memory, the circuitry configured to:
   receive one or more packets in a transmit opportunity (TXOP) from an access point (AP), the one or more packets comprising a first schedule comprising one or more scheduled time periods for the one or more packets from the AP, and a second schedule for transmitting, an uplink (UL) MU physical-layer convergence procedure protocol data unit (MU PPDU) to the AP; and
   transmit the UL MU PPDU, the UL MU PPDU comprising an acknowledgement of the one or more packets and UL data for the AP, wherein the UL MU PPDU is to be transmitted in accordance with the second schedule during a first UL time period of the TXOP.

2. The HE device of claim 1, wherein the acknowledgement is one from the following group:
   a block acknowledgement frame and acknowledgment frame.

3. The HE device of claim 1, wherein the one or more packets from the AP comprises a management frame.

4. The HE device of claim 1, wherein the circuitry is further to:
   transmit one or more data packets to the AP.

5. The HE device of claim 4, wherein the circuitry is further to:
   transmit the one or more data packets to the AP in the TXOP after the transmission of the acknowledgement of the one or more packets from the AP.

6. The HE device of claim 4, wherein the circuitry is further to:
   receive an acknowledgement from the AP to the transmitted one or more data packets in a next TXOP.

7. The HE device of claim 1, wherein the second schedule comprises a bandwidth for the HE device to transmit and an indication of a duration for how long the HE device can transmit.

8. The HE device of claim 1, wherein the circuitry is further to:
   wait a short interface space and then transmit the MU PPDU comprising the acknowledgement of the one or more packets in the TXOP.

9. The HE device of claim 1, wherein the circuitry is further to:
   receive an indication to use a new acknowledgement policy in at least one of a signal (SIG) field, in a media access control (MAC) field, in a beacon field, in a probe response, or in a MAC management frame; and
   wherein the circuitry is further configured to:
      transmit the UL MU PPDU comprising the acknowledgement of the one or more packets in the first scheduled UL MU PPDU, if the indication of the new acknowledgement policy is received, otherwise transmit the acknowledgement of the one or more packets according to a legacy protocol.

10. The HE device of claim 1, wherein the one or more data packets are transmitted using one or more of the following group: orthogonal frequency division multiple access (OFDMA) and multi-user multiple-input multiple-output (MU-MIMO) and are transmitted in accordance with Institute of Electrical and Electronic Engineers (IEEE) 802.11ax.

11. The HE device of claim 1, wherein the second schedule includes a duration for the acknowledgment of the one or more packets.

12. The HE device of claim 1 further comprising a transceiver coupled to the circuitry.

13. The HE device of claim 12 further comprising one or more antennas coupled to the transceiver.

14. A method for acknowledgement performed on an high efficiency (HE) device of a wireless local-area network (WLAN), the method comprising:
    receiving one or more packets in a transmit opportunity (TXOP) from an access point (AP), the one or more packets comprising a first schedule comprising one or more scheduled time periods for the one or more packets from the AP, and a second schedule for transmitting an uplink (UL) MU physical-layer convergence procedure protocol data unit (MU PPDU); and
    transmitting the UL MU PPDU, the UL MU PPDU comprising an acknowledgement of the one or more packets, wherein the UL MU PPDU is to be transmitted in accordance with the second schedule during a first UL time period of the TXOP.

15. The method of claim 14, wherein the acknowledgement is one from the following group:
    an acknowledgement frame and block acknowledgement frame.

16. The method of claim 15, wherein the second schedule includes a duration for the acknowledgment of the one or more packets.

17. An access point (AP), the AP comprising: memory; and, circuitry coupled to the memory, the circuitry configured to:
    transmit one or more packets simultaneously in a transmit opportunity (TXOP) to each of one or more high-efficiency (HE) devices in accordance with orthogonal frequency division multiple access (OFDMA), wherein the one or more packets indicate a first schedule for the one or more packets and a second schedule for each of the one or more HE devices to transmit simultaneously a multi-user physical-layer convergence procedure protocol data unit (MU PPDU); and receive MU PPDUs from the one or more HE devices, wherein the MU PPDUs from the one or more HE devices are to be received simultaneously in accordance with the second schedule, and wherein each of the MU PPDUs comprises an acknowledgement of packets received by a corresponding HE device received in accordance with the first schedule.

18. The AP of claim 17, further comprising:
a transceiver coupled to the circuitry; and
one or more antennas coupled to the transceiver.

19. The AP of claim 17, wherein the acknowledgment is one from the following group:
acknowledgement frame and block acknowledgement frame.

20. The AP of claim 19, wherein the second schedule includes a duration for each of the one or more HEW devices to transmit the acknowledgment of the one or more packets.

21. The AP of claim 17, wherein the circuitry is further configured to:
receive a management frame from at least one of the one or more HE devices; and
transmit an acknowledgement of the management frame to each of the at least one of the one or more HEW devices in a next scheduled MU-PPDU.

22. A non-transitory computer-readable storage medium that stores instructions for execution by one or more processors to perform operations for an high-efficiency (HE) station, the instructions to configure the one or more processors to cause the HE station to:
receive one or more packets in a transmit opportunity (TXOP) from an access point (AP), the one or more packets comprising a first schedule comprising one or more scheduled time periods for the one or more packets from the AP, and a second schedule for transmitting an uplink (UL) MU physical-layer convergence procedure protocol data unit (MU PPDU); and
transmit the UL MU PPDU, the UL MU PPM comprising an acknowledgement of the one or more packets, wherein the UL MU PPDU is to be transmitted in accordance with the second schedule during a first UL scheduled time period of the TXOP.

23. The non-transitory computer-readable storage medium of claim 22, wherein the acknowledgement is one from the following group:
an acknowledgment frame and block acknowledgment frame.

* * * * *

UNITED STATES PATENT AND TRADEMARK OFFICE
CERTIFICATE OF CORRECTION

PATENT NO. : 9,705,643 B2
APPLICATION NO. : 14/563406
DATED : July 11, 2017
INVENTOR(S) : Li et al.

It is certified that error appears in the above-identified patent and that said Letters Patent is hereby corrected as shown below:

On the Title Page

On page 2, in Column 1, under "Other Publications", Line 6, before "pgs.", insert --5--

On page 2, in Column 2, under "Other Publications", Line 30, delete "Internationl" and insert --International-- therefor In the Claims In Column 13, Line 41-42, in Claim 1, delete "transmitting," and insert --transmitting-- therefor In Column 16, Line 16, in Claim 22, delete "UL MU PPM" and insert --UL MU PPDU-- therefor Signed and Sealed this
Tenth Day of April, 2018

Andrei Iancu
*Director of the United States Patent and Trademark Office*